United States Patent Office 3,708,579
Patented Jan. 2, 1973

3,708,579
ANTI-ARTHRITIC COMPOSITIONS COMPRISING A TRIALKYLPHOSPHINEGOLD COMPLEX OF A 1-β-D-GLUCOPYRANOSIDE AND METHODS OF PRODUCING ANTI-ARTHRITIC ACTIVITY
Elizabeth R. McGusty, Philadelphia, and Blaine M. Sutton, Hatboro, Pa., assignors to Smith Kline & French Laboratories, Philadelphia, Pa.
No Drawing. Continuation-in-part of application Ser. No. 871,956, Oct. 28, 1969, now Patent No. 3,635,945, dated Jan. 18, 1972. This application Oct. 1, 1971, Ser. No. 185,845
Int. Cl. A61k 27/00
U.S. Cl. 424—180
14 Claims

ABSTRACT OF THE DISCLOSURE

Pharmaceutical compositions having anti-arthritic activity comprising a trialkylphosphinegold complex of a 1-β-D-glucopyranoside and methods of producing anti-arthritic activity by administering internally, preferably orally, said compositions.

---

This application is a continuation-in-part of application Ser. No. 871,956 filed Oct. 28, 1969 now U.S. Pat. 3,635,945.

This invention relates to novel pharmaceutical compositions having anti-arthritic activity and to methods of producing anti-arthritic activity by administering said compositions. More specifically the compositions of this invention comprise a trialkylphosphinegold complex of a 1-β-D-glucopyranoside as the active medicament. The anti-arthritic activity of the active medicament is measured by its ability to inhibit adjuvant-induced polyarthritis in rats. Thus the active medicaments of this invention decrease the inflammed hind leg volumes in experimental rats when compared to controls at oral doses of 5–10 mg./kg./day. Of particular importance is the attainment of significant serum levels of gold following oral administration of these doses.

Gold salts have been known for many years to have anti-arthritic activity. However, their utility is limited by the requirement that they be administered by the parenteral route and the frequent occurrence of limiting side effects. The compositions of this invention have distinct advantages in that they are active upon oral administration with less severe side effects.

The novel pharmaceutical compositions of this invention, in dosage unit form, comprise a nontoxic pharmaceutical carrier and a trialkylphosphinegold complex of a 1-β-D-glucopyranoside represented by the following structural formulas:

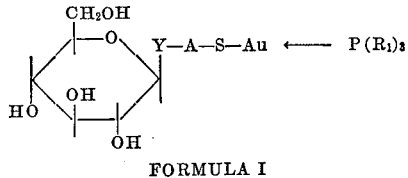

FORMULA I

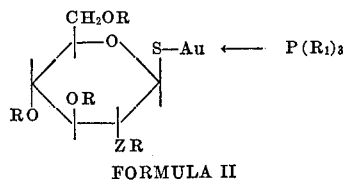

FORMULA II wherein:

R represents acetyl or, when Z is oxygen, hydrogen;

$R_1$ represents lower alkyl, straight or branched, of from 1 to 4 carbon atoms;

A represents an alkylene chain, straight or branched, of from 2 to 5 carbon atoms;

Y represents oxygen or sulfur; and

Z represents oxygen or —NH—.

The compounds of Formula I above are prepared by the reaction of an alkali metal salt of thioalkyl-1-β-D-glucopyranoside, preferably the sodium salt, with a trialkylphosphinegold halide, preferably chloride in a nonreactive organic solvent at a temperature of from −20 to −10° C. for from one-half to two hours. Following isolation, the product is purified by chromatography on silica gel.

The compounds of Formula II above when R is hydrogen are prepared by the reaction of an alkali metal salt of 1-thio-β-D-glucopyranose, preferably the sodium salt, with a trialkylphosphinegold halide, preferably chloride, in a nonreactive organic solvent at a temperature of from −20 to −10° C. for from one-half to two hours.

To prepare the compounds of Formula II above when R is acetyl, an S-(2,3,4,6-tetra-O-acetylglucopyranosyl)-1-thiopseudourea hydrohalide, preferably hydrochloride or hydrobromide, is treated with an aqueous solution of an alkali metal carbonate, preferably potassium carbonate, to give the alkali metal salt of the 1-thio-tetraacetyl derivative which is then reacted with a trialkylphosphinegold halide as described above. When Z is —NH— in Formula II, an S-(2-acetamido-2-deoxy-3,4,6-tri-O-acetylglycopyranosyl)-thiopseudourea hydrohalide is employed in the above reaction sequence.

The trialkylphosphinegold halides employed as described above are prepared as follows. For example, a solution of thiodiglycol in a nonreactive organic solvent is treated with an aqueous solution of gold acid chloride trihydrate, cooled to a temperature of from −10 to −5° C. and then reacted with a trialkylphosphine to give the corresponding trialkylphosphinegold chlorides.

The compounds of Formulas I and II may be administered orally in conventional dosage unit forms such as tablets, capsules or the like, by incorporating the appropriate dose of said compounds with carriers according to accepted pharmaceutical procedures. In practice, unit doses of from 1 mg. to 10 mg., preferably 1 to 5 mg. administered from 1 to 2 times a day are effective.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent include any time delay material well known to the art, such as glyceryl monostreate or glyceryl distrearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The method in accordance with this invention comprises administering internally to an animal organism a trialkylphosphinegold complex of a 1-β-D-glucopyranoside of Formulas I or II above, usually combined with a pharmaceutical carrier, in an amount sufficient to produce anti-arthritic activity without limiting side effects. The active medicament will be administered in a dosage unit, preferably in an amount of from about 1 mg. to about 10 mg. The route of administration may be orally or parenterally, the oral route being preferred. Advantageously equal doses will be administered one or two times daily with the daily dosage regimen being from about 1 mg. to about 20 mg. When the method described above is carried out anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

A representative tablet has the following composition:

| Ingredients: | Mg./tablet |
|---|---|
| S - triethylphosphinegold 2,3,4,6-tetra-O-acetyl-1-thio-β-D-glucopyranoside | 5 |
| Calcium sulfate, dihydrate | 150 |
| Starch | 15 |
| Talc | 5 |
| Stearic acid | 3 |

A representative capsule has the following composition:

| Ingredients: | Mg./capsule |
|---|---|
| S - triethylphosphinegold 2,3,4,6-tetra-O-acetyl-1-thio-β-D-gluco pyranoside | 10 |
| Magnesium stearate | 5 |
| Lactose | 400 |

The following examples illustrate the preparation of active medicaments of this invention. Alternatives and modifications of the general procedures set forth herein will be apparent to those skilled in the art. These procedures make fully apparent all of the compounds embraced by the general formulas given above.

PREPARATIONS (A) Triethylphosphinegold chloride

A solution of 10.0 g. (0.08 mole) of thiodiglycol in 25 ml. of ethanol is mixed with a solution of 15.76 g. (0.04 mole) of gold acid chloride trihydrate in 75 ml. of distilled water. When the bright orange-yellow solution is almost colorless, it is cooled to −5° C. and an equally cold solution of 5.0 g. (0.0425 mole) of triethylphosphine in 25 ml. of ethanol is added dropwise to the stirred solution. After the addition is complete, the cooled mixture is stirred for ½ hour. Solid that separates is removed and the filtrate is concentrated to about 30 ml. to yield a second crop. The combined solid is washed with aqueous-ethanol (2:1) and recrystallized from ethanol by adding water to the cloud point. The product is obtained as white needles, M.P. 85–86° C.

(B) Triisopropylphosphinegold chloride

A mixture of 11.82 g. (0.03 mole) of gold acid chloride trihydrate and 7.9 g. (0.065 mole) of thioglycol in 100 ml. of aqueous ethanol (3:2) is stirred until the color of auric gold disappears. The almost colorless solution is cooled to −5° C. and a solution of 5.6 g. (0.035 mole) of triisopropylphosphine in 20 ml. of ethanol is added dropwise. The volume of the final reaction mixture is increased to 250 ml. with aqueous ethanol (1:1) in order to maintain a fluid mixture. After the addition is complete, the mixture is stirred in the cold for 45 minutes. The solid is removed by filtration, washed first with alcohol-water (1:2) then with water and dried. It is redissolved by suspending in ethanol and adding sufficient methylene chloride for solution. The cloudy solution is filtered from suspended gold and the filtrate concentrated until crystallization. There is obtained white crystals, M.P. 184–6° C.

(C) Tributylphosphinegold chloride

A mixture of 3.94 g. (0.01 mole) of gold acid chloride trihydrate and 2.5 g. (0.021 mole) of thiodiglycol in 75 ml. of aqueous ethanol (2:1) is stirred until the color of auric gold disappears. The colorless solution is cooled to −5° C. and a solution of 3.03 g. (0.015 mole) of tributylphosphine in 25 ml. of ethanol is added dropwise. The cooled mixture is stirred an additional hour, concentrated under reduced pressure and the residue fractionated by silica gel (150 g.) chromatography using ethyl ether as the eluent. Tributylphosphinegold chloride is obtained as a pale yellow oil.

(D) Trimethylphosphinegold chloride

A solution of 2.44 g. (0.02 mole) of thiodiglycol in 15 ml. of methanol is mixed with a solution of 3.98 g. (0.01 mole) of gold acid chloride trihydrate in 25 ml. distilled water. When the orange-yellow solution becomes almost colorless, it is cooled to −15° C. and an equally cold solution of 760 mg. (0.01 mole) of trimethylphosphine in 10 ml. of methanol is added dropwise to the stirred solution. After the addition, the cooled mixture is stirred for one-half hour. The product is filtered off and the filtrate concentrated under reduced pressure to yield a second crop. The combined product is washed with cold aqueous methanol (2:1) and water to give trimethylphosphinegold chloride, M.P. 228–229° C.

(E)

Similarly reaction of other trialkylphosphines as defined by $R_1$ above with gold acid chloride trihydrate yields the corresponding trialkylphosphinegold chlorides.

EXAMPLE 1

Triethylphosphinegold chloride (11.0 g., 0.0315 mole) is added to a cold, stirred solution of 8.9 g. (0.035 mole) of sodium 1-thio-β-D-glucopyranose dihydrate in 250 ml. of dry methanol. After complete solution, the mixture is stirred at room temperature. When starting material is no longer detected by thin layer chromatographic monitoring of the reaction mixture, solvent is removed under reduced pressure and the residue partitioned between water and methylene chloride-ethyl acetate (1:1). The organic layer is separated, dried over anhydrous sodium sulfate, filtered and the filtrate concentrated under reduced pressure. The crude residue is purified by chromatography on silica gel (450 g.) using ether-methanol (1:1) eluent and the product S-triethylphosphinegold 1-thio-β-D-glucopyranoside, is obtained after drying in vacuo as a glassy white hygroscopic solid.

EXAMPLE 2

Sodium 1 - thio - β - D - glucopyranose dihydrate (3.18 g., 0.0125 mole) is added to a cooled (−10° C.) solution of 5.42 g. (0.0125 mole) of tri-n-butylphosphinegold chloride, 50 ml. of dry methanol and the mixture stirred for one hour. The reaction mixture is filtered from suspended solid, the filtrate concentrated under reduced pressure and the residue purified by silica gel (200 g.) chromatography using methylene chloride-acetone (2:1) as the eluent. There is obtained as an amorphous hydroscopic solid S - tri-n-butylphosphinegold 1-thio-β-D-glucopyranoside.

EXAMPLE 3

Sodium 1 - thio - β - D - glucopyranose dihydrate (2.54 g., 0.01 mole) in 25 ml. of distilled water is added to a cooled (−10° C.) solution of 3.93 g. (0.01 mole) of triisopropylphosphinegold chloride in 25 ml. of acetone. After the addition, the cooled mixture is stirred for ½ hour, concentrated under reduced pressure and the residue partitioned between methylene chloride and water. The combined organic material is dried over anhydrous sodium sulfate, filtered and the filtrate concentrated under reduced pressure. The residue is purified by chromatography on silica gel (150 g.) using hexane-acetone (1:3) as the eluent. There is obtained an amorphous hygroscopic solid, S - triisopropylphosphinegold 1 - thio-β-D-glucopyranoside.

EXAMPLE 4

A cold solution of 1.66 g. (0.012 mole) of potassium carbonate in 20 ml. of distilled water is added to a solution of 5.3 g. (0.011 mole) of S-(2,3,4,6-tetra-O-acetylglucopyranosyl)-thiopseudourea hydrobromide [Methods in Carbohydrate Chemistry, Vol. II, p. 435 (1963)] in 30 ml. of water at −10° C. A cold solution of 3.86 g. (0.011 mole) of triethylphosphinegold chloride in 30 ml. of ethanol containing a few drops of methylene chloride is added to the above mixture before hydrolysis of the thiouronium salt is complete. After the addition is complete, the mixture is stirred in the cold for ½ hour. The solid that separates is removed, washed first with aqueous ethanol then water and dried in vacuo. There is obtained colorless crystals, M.P. 110–111° C., of S - triethylphosphinegold 2,3,4,6 - tetra - O - acetyl - 1 - thio-β-D-glucopyranoside.

Similarly prepared employing tributylphosphinegold chloride is S - tributylphosphinegold 2,3,4,6 - tetra-O-acetyl-1-thio-β-D-glucopyranoside.

EXAMPLE 5

A cold (−10° C.) mixture of 0.96 g. (0.0069 mole) of potassium carbonate and 2.33 g. (0.0053 mole) of S-(2-acetamido - 2 - deoxy - 3,4,6 - tri - O - acetylglucopyranosyl) - thiopseudourea hydrochloride (prepared from the 1-chloro precursor) is stirred together to affect partial hydrolysis of the thiouronium salt. After 15 minutes, a solution of 2.35 g. (0.0054 mole) of tributylphosphinegold chloride in 25 ml. of methanol is added dropwise, at such a rate that the temperature does not exceed −5° C. The mixture is stirred an additional ½ hour after complete addition, is concentrated under reduced pressure and the residue partitioned between water and methylene chloride. The combined organic material is dried over anhydrous sodium sulfate, filtered and the filtrate concentrated to a viscous oil. Purification of final product is accomplished on silica gel (100 g.) using methylene chloride: ethyl acetate (4:1) as the eluent. There is obtained as an amorphous white hydroscopic solid, S - tributylphosphinegold 2 - acetamido - 2 - deoxy-3,4,6-tri-O-acetyl-1-thio-β-D-glucopyranoside.

EXAMPLE 6

A solution of potassium thioacetate (0.0143 mole) is prepared from 0.8 g. (0.0143 mole) of potassium hydroxide in 20 ml. of absolute ethanol and 1.09 g. (0.0143 mole) of thioacetic acid and is added to a warm solution of 5.85 g. (0.0143 mole) of 2' - chloroethyl 2,3,4,6-tetra-O-acetyl-β - D - glucopyranoside in 50 ml. of absolute ethanol. The resulting solution is refluxed for 3 hours, cooled and filtered. The filtrate is concentrated under reduced pressure and the residue cooled to give crystalline 3 - acetyl - 2' - thioethyl 2,3,4,6-tetra - O - acetyl - β-D-glucopyranoside, M.P. 80–81° C.

A cold solution of 1.08 g. (0.02 mole) of sodium methoxide in 25 ml. of methanol is added to a cold stirred solution of 4.5 g. (0.01 mole) of S-acetyl-2'-thioethyl 2,3,4,6-tetra-O-acetyl-β-D-glucopyranoside in a mixture of 5 ml. of methylene chloride and 45 ml. of methanol. Rate of addition maintained so that the reaction temperature does not exceed −20° C. When acetate hydrolysis is complete (thin layer chromatographic evidence), a cold solution of 3.5 g. (0.01 mole) of triethylphosphinegold chloride in 30 ml. of methanol-methylene chloride (5:1) is added, dropwise. After the addition is complete, the mixture is stirred for an additional ½ hour, concentrated under reduced pressure and the residue purified by chromatography on silica gel (200 g.) using chloroform methanol (9:1) as the eluent. The product, S-triethylphosphinegold 2'-thioethyl-1-β-D-glucopyranoside, is obtained as a white hygroscopic glass.

EXAMPLE 7

A solution of the potassium salt of thioacetic acid is prepared by adding 2.66 g. (0.035 mole) of thioacetic acid to an alcoholic solution of 1.96 g. (0.035 mole) of potassium hydroxide in 25 ml. of ethanol. This is added to a solution of 16.47 g. (0.035 mole) of 2'-bromoethyl 1 - thio - 2,3,4,6 - tetra - O - acetyl - β-D-glucopyranoside in 100 ml. of hot absolute ethanol and the reaction mixture is refluxed for one and one-half hours. The solvent is removed under reduced pressure and the residue is partitioned between water and chloroform. The chloroform extracts are combined, dried and evaporated under reduced pressure to give S - acetyl - 2'-thioethyl 1-thio-2,3,4,6 - tetra - O - acetyl - β - D - glucopyranoside, M.P. 110–112° C.

A solution of 1.62 g. (0.03 mole) of sodium methoxide in 25 ml. of methanol is added dropwise with stirring to a cooled mixture of 4.66 g. (0.01 mole) of S-acetyl-2'-thioethyl 1 - thio - 2,3,4,6 - tetra - O - acetyl - β - D-glucopyranoside in 75 ml. of methanol under a nitrogen atmosphere. The rate of addition is such so as not to exceed a reaction temperature of −15° C. After complete solution, a cold solution of 3.5 g. (0.01 mole) of triethylphosphinegold chloride in 25 ml. of methanol is added dropwise. Stirring in the cold is continued for ½ hour, before the entire reaction mixture is concentrated under reduced pressure. The residue is extracted with methylene chloride, the extract filtered and the filtrate concentrated. Final purification is accomplished using silica gel (120 g.) chromatography, acetone eluent. The product, obtained as a white hygroscopic glass, is S-triethylphosphinegold 2'-thioethyl-1-thio-β-D-glucopyranoside.

EXAMPLE 8

A cold (−10° C.) solution of 3.08 g. (0.01 mole) of trimethylphosphinegold chloride in 30 ml. of acetone is added dropwise to an equally cold, stirred solution of sodium 1-thio-β-D-glucopyranose dihydrate (2.54 g.; 0.01 mole) in 25 ml. of distilled water. Stirring is continued at −10° C. for an hour. The white solid product is filtered and the filtrate concentrated under reduced pressure to yield a second crop. The combined product is washed with cold aqueous acetone (2:1) then water. After drying it is chromatographed on silica (150 g.) using acetone as the eluent to give S-trimethylphosphinegold 1-thio-β-D-glucopyranoside, M.P. 130–132° C.

EXAMPLE 9

To a solution of 9.0 g. (0.0221 mole) of S-acetyl 1-thio - 2,3,4,6 - tetra - O - acetyl - β - D - glucopyranose in 300 ml. of dry carbon tetrachloride is added 10.7 g. (0.067 mole) of bromine in 10 ml. of dry carbon tetrachloride and the reaction mixture is stirred at room temperature for 10 minutes. The excess bromine is eliminated by passing a rapid stream of nitrogen through the reaction mixture and collected in a flask containing 200 ml. of dry carbon tetrachloride. Propylene is passed into the dark red solution until it becomes pale yellow. The reaction mixture is stirred at room temperature for 90 minutes and the solvent is evaporated under reduced pressure. The crude product is crystallized from anhydrous ether using activated charcoal and chromatographed through 70 g. of silica gel using 65% anhydrous ether in petroleum ether as the eluent. The eluted product is recrystallized from anhydrous ether to give 2'-bromopropyl 1-thio - 2,3,4,6 - tetra-O-acetyl-β-D-glucopyranoside, M.P. 115–121° C.

Following the procedures of Example 7 the above prepared 2'-bromopropyl glucopyranoside is converted to S-acetyl-2'-thiopropyl 1-thio - 2,3,4,6 - tetra-O-acetyl-β-D-glucopyranoside which is then reacted with triethylphosphinegold chloride to give S-triethylphosphinegold 2'-thiopropyl-1-thio-β-D-glucopyranoside.

EXAMPLE 10

To a solution of 6.0 g. (0.0147 mole) of S-acetyl 1-thio-O-acetyl-β-D-glucopyranose in 200 ml. of dry carbon tetrachloride is added 6.39 g. (0.04 mole) of bromide in 10 ml. of dry carbon tetrachloride and the reaction mixture is stirred at room temperature for 15 minutes. The excess bromine is eliminated by passing a rapid stream of nitrogen into the reaction mixture and collected in a flask containing 200 ml. of carbon tetrachloride. Trans-2-butene is passed into the dark red solution until it becomes pale yellow. The solvent is evaporated under reduced pressure and petroleum ether is added to the residue to crystallize the crude product. It is recrystallized from anhydrous ether using activated charcoal and chromatographed through 60 g. of silica gel using 70% anhydrous ether in petroleum ether as the eluent. The eluted product is recrystallized from anhydrous ether to yield 1'-methyl-2'-bromopropyl 1-thio - 2,3,4,6 - tetra - O - acetyl - $\beta$ - D-glucopyranoside, M.P. 124.5–126° C.

Following the procedures of Example 7 the above prepared 1'-methyl-2'-bromopropyl glucopyranoside is converted to S-acetyl-1'-methyl-2'-thiopropyl 1-thio-2,3,4,6-tetra-O-acetyl-$\beta$-D-glucoypyranoside which is reacted with triethylphosphinegold chloride to yield S-triethylphosphinegold 1'-methyl-2'-thiopropyl-1-thio-$\beta$-D-glucopyranoside.

What is claimed is:

1. A pharmaceutical composition having anti-arthritic activity, in dosage unit form, comprising a pharmaceutical carrier and an effective, non-toxic amount of an anti-arthritic agent having one of the formulas:

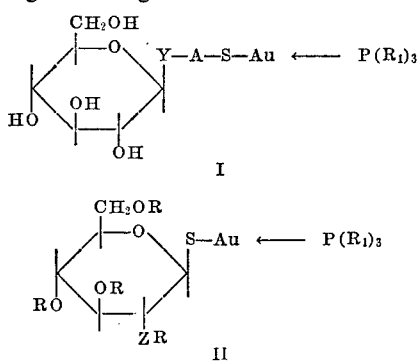

in which:
R is acetyl or, when Z is oxygen, hydrogen;
$R_1$ is lower alkyl, straight or branched chain, of from 1 to 4 carbon atoms;
A is an alkylene chain, straight or branched, of from 2 to 5 carbon atoms;
Y is oxygen or sulfur; and
Z is oxygen or —NH—.

2. A pharmaceutical composition according to claim 1 having Formula I.
3. A pharmaceutical composition according to claim 2 in which A is ethylene.
4. A pharmaceutical composition according to claim 3 in which $R_1$ is ethyl.
5. A pharmaceutical composition according to claim 4 in which Y is oxygen.
6. A pharmaceutical composition according to claim 4 in which Y is sulfur.
7. A pharmaceutical composition according to claim 1 having Formula II.
8. A pharmaceutical composition according to claim 7 in which Z is oxygen.
9. A pharmaceutical composition according to claim 8 in which R is hydrogen.
10. A pharmaceutical composition according to claim 9 in which $R_1$ is ethyl.
11. A pharmaceutical composition according to claim 8 in which R is acetyl.
12. A pharmaceutical composition according to claim 11 in which $R_1$ is ethyl.
13. The method of producing anti-arthritic activity which comprises administering internally to an animal organism in an amount sufficient to produce said activity without limiting side effects a trialkylphosphinegold complex of 1-$\beta$-D-glucopyranoside having one of the formulas:

in which:
R is acetyl or, when Z is oxygen, hydrogen;
$R_1$ is lower alkyl, straight or branched chain, of from 1 to 4 carbon atoms;
A is an alkylene chain, straight or branched, of from 2 to 5 carbon atoms;
Y is oxygen or sulfur; and
Z is oxygen or —NH—.

14. The method according to claim 13 in which the active medicament is S-triethylphosphinegold 2,3,4,6-tetra-O-acetyl-1-thio-$\beta$-D-glucopyranoside.

References Cited

UNITED STATES PATENTS 3,074,930   1/1963   Hitchings et al. ____ 260—211.5

STANLEY J. FRIEDMAN, Primary Examiner

U.S. Cl. X.R.

424—203

UNITED STATES PATENT AND TRADEMARK OFFICE

CERTIFICATE EXTENDING PATENT TERM
UNDER 35 U.S.C. 156

Patent No.    : 3,708,579

Dated         : Jan. 2, 1973

Inventor(s)   : Mc Gusty et al.

Patent Owner  : Smithkline Beckman Corp.

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Eighteenth day of April, 1986.

Donald J. Quigg

Assistant Secretary and Commissioner of Patents and Trademarks